United States Patent [19]

Wagoner

[11] Patent Number: 4,707,070

[45] Date of Patent: Nov. 17, 1987

[54] FIBER OPTIC CABLE SPLICING APPARATUS AND METHOD

[75] Inventor: Roy J. Wagoner, Albuquerque, N. Mex.

[73] Assignee: GTE Communication Systems, Phoenix, Ariz.

[21] Appl. No.: 737,982

[22] Filed: May 28, 1985

[51] Int. Cl.[4] .............................................. G02B 6/38
[52] U.S. Cl. .................................................... 350/96.21
[58] Field of Search ............... 350/96.15, 96.20, 96.21, 350/96.22, 320

[56] References Cited

U.S. PATENT DOCUMENTS

| | | | |
|---|---|---|---|
| 4,557,556 | 12/1985 | Decker, Jr. ...................... | 350/96.21 |
| 4,557,557 | 12/1985 | Gleason et al. ................. | 350/96.21 |
| 4,561,719 | 12/1985 | Quan ............................... | 350/96.21 |

Primary Examiner—Eugene R. LaRoche
Assistant Examiner—James C. Lee
Attorney, Agent, or Firm—Anthony Miologos; Peter Xiahros

[57] ABSTRACT

An arrangement for splicing and aligning two fiber optic cables is disclosed comprising a fixed connector stage and a movable connector stage. The fixed connector stage includes a fiber optic connector having a first fiber optic cable mounted therein. The first fiber optic cable has one of its ends connected to a source of light energy. The movable connector stage also includes a fiber optic connector having a second fiber optic cable housed therein. The two connector stages are located adjacent to the other with the two optical fibers coarsely aligned alog a horizontal axis. An alignment fixture is then mounted to the movable connector stage and an end of the second fiber optic cable connected to a photo-detector device. The light detector is electrically connected to a control device with the control device in turn electrically connected to the alignment fixture. The control device transmits control signals to the alignment fixture moving the fixture until the light detector senses the least amount of coupling loss between the fiber optic cables. The movable connector stage is then fixed with respect to the fixed connector stage and the alignment fixture and photo-detector removed.

9 Claims, 4 Drawing Figures

FIBER OPTIC CABLE SPLICING APPARATUS AND METHOD

CROSS-REFERENCE TO RELATED APPLICATIONS

The present application is related to co-pending U.S. application Ser. No. 737,983, entitled "A METHOD FOR SPLICING FIBER OPTIC CABLE", having the same inventive entity and being assigned to the same assignee.

BACKGROUND OF THE INVENTION

This invention relates in general to an arrangement for connecting fiber optic cable and more particularly to an improved arrangement for connecting the ends of two single mode fiber optic cables in order to provide for a low loss connection.

When the ends of two optical fibers are to be spliced, the first consideration is to make the connection in such a manner that excessive losses of the light energy will not take place at the splice.

One method presently known for making such a splice is the use of a special machine which prepares the ends of the fibers and also supplies an arc which heats the prepared ends. The fiber ends are then butted together under pressure, bonding the ends together molecularly. A strengthening sleeve is then applied to cover the splice. This method finds disadvantage in that the fiber ends must be perfectly flat and parallel and both fibers must be composed of the same type of fiber.

Another method for effecting a splice of two optical fibers is pressure bonding. This method requires the careful cleaving of each fiber so as to produce ends which are perfectly flat and parallel. The ends are then butted together and a metal jacket applied over each fiber end. This method finds disadvantage in that the preparation of the fiber ends must match exactly or excessive losses will occur. Further, any strain applied to the splice may separate the fibers causing a failure of the splice.

Still another method of splicing optical fibers uses an "optical adhesive" to bond the ends of the fibers after they have been prepared to present flat and parallel end surfaces to one another. A metal jacket is then used to cover the splice in order to give strength to the joint.

In all the above referenced techniques each end of the connecting fibers must be formed perfectly flat and parallel to the other in order to efficiently transmit all the light energy with a minimum signal loss. Additionally, the two fiber optic ends must be positioned precisely along the horizontal axis or coupling losses will result. Given the fact that the core of a fiber optic cable may measure 10 micrometers or less the job of cleaving and grinding the ends to form the proper surfaces for splicing and subsequently aligning the two ends is therefor a very exacting and labor intensive task.

One method presently known for splicing optical fiber cable circumventing the disadvantages discussed above is the use of optical fiber connector units. These high precision components are comprised of a plug ferrule, receptacles and a plug polisher. The connector units resemble those used for coaxial cable and provide connection losses of only 0.5 dB.

The disadvantage with this type of connection is the high per unit cost for these devices. For example, single mode optical fiber connectors manufactured by Seico Instruments cost upward of $400.00 per connector.

Still another disadvantage to optical connectors is that they must be assembled using epoxy adhesives to hold the optical fiber in alignment; the epoxies often require exposure to an ultraviolet curing light or high temperatures. Furthermore if, once the epoxy has cured, the fiber alignment is unsatisfactory, the connector has to be cut off and discarded.

Accordingly, it is the object of the present invention to provide an improved, efficient and cost effective means for connecting or splicing single mode fiber optic cable.

SUMMARY OF THE INVENTION

In accomplishing the object of the present invention there is provided an arrangement for splicing a first fiber optic cable to a second fiber optic cable. The first fiber optic cable includes one end connected to a source of light energy.

The arrangement comprises a fixed connector stage including first connector means mounted to the fixed connector stage. The first connector means has the first fiber optic cable mounted therein. A second connector means is mounted to a movable connector stage with the second connector means having the second fiber optic cable mounted therein. The movable connector stage is located in close proximity to the fixed connector stage with the first fiber optic cable located along a common horizontal axis with the second fiber optic cable.

The alignment of the first fiber optic cable to the second fiber optic cable is accomplished by alignment means which includes a pair of mounting pins arranged to have the movable connector stage temporarily mounted to the pins. A light detector is connected to an end of the second fiber optic cable and is electrically connected to a control device. The control device is in turn electrically connected to the alignment means.

The light detector measures the amount of light being coupled from the first fiber optic cable across to the second fiber optic cable and sends signals representative of the light levels detected to the control device. The control device in turn transmits control signals to the alignment means which moves the second connector stage relative to the first connector stage. The movable connector stage is moved until the light detector detects a point of least connection loss or maximum light coupling between the first fiber optic cable and the second fiber optic cable. The alignment means is then removed and the movable connector stage is fixed relative to the fixed connector stage.

A BRIEF DESCRIPTION OF THE DRAWINGS

DESCRIPTION OF THE PREFERRED EMBODIMENT

Figure 1:
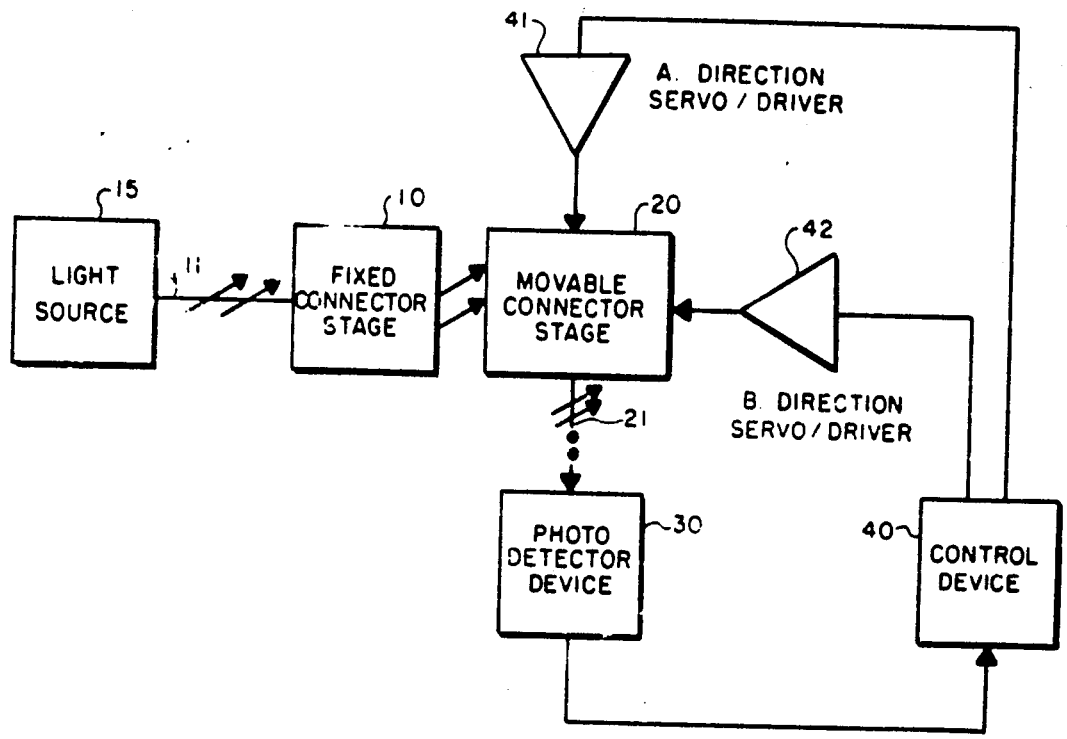
FIG. 1 is a block diagram illustrating the concept of the present invention.

Turning now to FIG. 1 of the included drawings there is illustrated in block diagram the concept of the present invention. The invention comprises a fixed connector stage 10, and a movable connector stage 20. A fiber optic cable 11 connects the fixed connector stage 10 to a light source 15. Light source 15, may be any type of device presently known to those skilled in the art for injecting light into the transmit end of a fiber optic cable system. The movable connector stage 20, is connected via fiber optic cable 21 to a photo detector device 30. The length of fiber optic cable 21 is variable and ideally would be a spool of the fiber cable which will eventually be run to a receiving end in the fiber optic cable system. The photo detector device 30 has an electrical connection to a control device 40 with the control device electrically connected to a first A direction servo driver 41 and a second B direction servo driver 42.

The device of the present invention is used to advantage by connecting fiber optic cable 11 into the fixed connector stage 10 and connecting one end of fiber optic cable 21 into the movable connector stage 20. The opposite end of fiber optic cable 21 is connected to photo-detector device 30. The fixed 10 and movable 20 connector stages are butted together and the light source 15 turned on. Control device 40 is then activated which provides control signals to servo drivers 41 and 42 operating mechanical servos that move the movable connector stage 20 in first or alternatively a second direction. The movable connector stage is moved until photo detector 30 detects a peak light output at which time a signal is sent to the control device indicating alignment of the two fiber ends has been made. The servos are then shut down and the movable connector stage 20 tightened or permanently affixed to the fixed connector stage 10.

Figure 2:
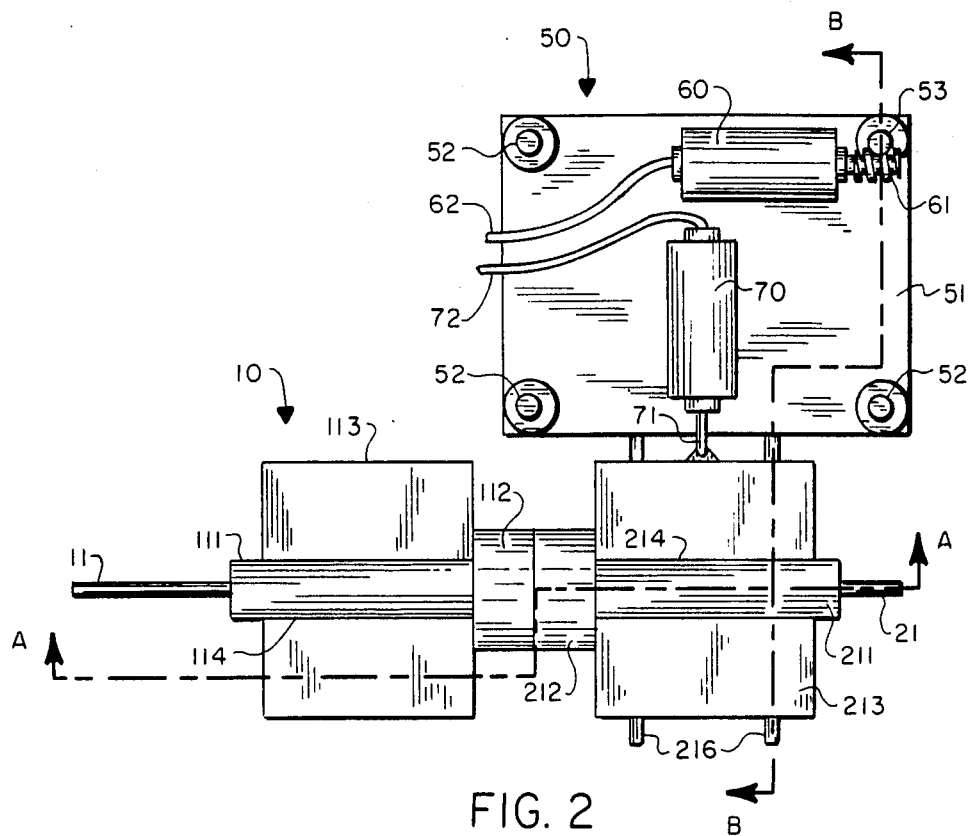
FIG. 2 is a top plan view of the fixed connector stage and movable connector stage in accordance with the invention and including an embodiment of an alignment platform for effecting the connection of the stages.
Figure 3:
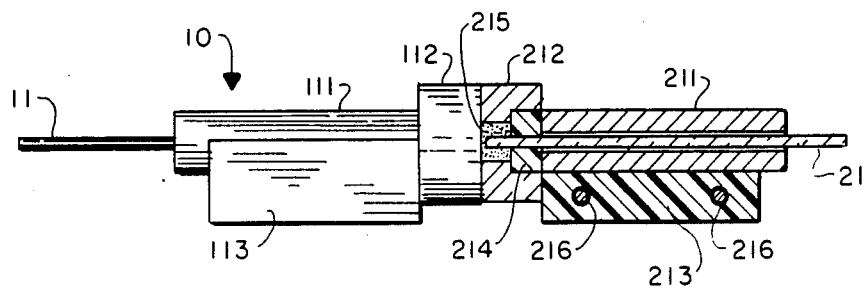
FIG. 3 is a sectional view taken substantially along line A—A of FIG. 2.
Figure 4:
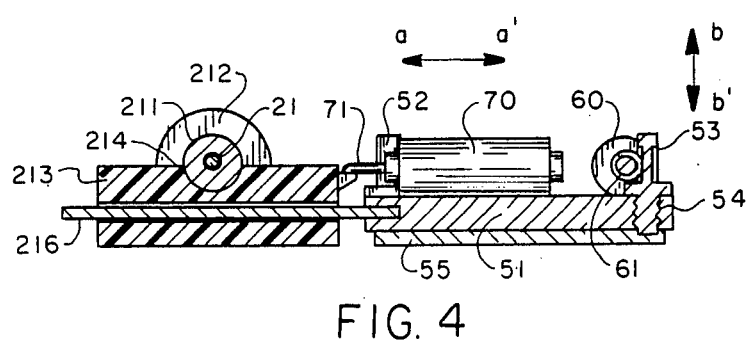
FIG. 4 is a sectional view taken substantially along line B—B of FIG. 2.

Turning now to FIGS. 2, 3 and 4, an embodiment depicting a way in which the concepts discussed above can be used to advantage is illustrated. The fixed connector stage 10 is comprised of a first fiber connector including a body 111 and a head end 112. The connector body 111 rests on a fixture 113 partially within a longitudinal channel 114. The connector body 111 is normally permanently affixed to fixture 113. The movable connector stage 20 is comprised of a second fiber connector including a body 211 and a head end 212. The connector body 211 rests on a fixture 213 partially within a longitudinal channel 214.

The connector bodies 111, 112 and head ends 112, 212 are composed of a rigid metallic material while the fixtures may be composed of a rigid plastic material. The fiber optic cable 11 extending from light source 15 would normally have its cladding striped off the end cleaved and polished and inserted into connector body 111. Likewise, fiber optic cable 21 would be prepared and inserted into connector body 211 after the same type of preparation.

As can be seen at the sectional elevation of FIG. 2 the fiber cable 21 enters body 211 at an end opposite the head end 212. Before entering the head end the cable passes through a resilient ferrule 214 which holds the cable in position within the connector, as well as, isolating the connection chamber 215 from body 212. Optical fiber 11 traverses and is installed within the first fiber connector in the same manner described above for the second fiber connector.

The prepared ends are then positioned adjacent the outer edge toward the other connector head end and the connection chamber 215 filled with matching fluid. When head ends 112 and 212 are butted against each other the prepared ends of fiber optic cables 11, 21 are positioned in close proximity to each other but do not contact each other. The fixed connector stage 10 is then tighten down to a mounting surface.

In order to exactly align the two fiber ends a servo driven platform 50 is attached to the movable connector stage 20. A pair of holes oriented parallel to each other traverse internally through fixture 213. A pair of mounting pins 216 extending from a top plate 51 of platform 50 are arranged to be accepted by the respective holes on fixture 213. Thereby, mounting the movable connector stage 20 to platform 50.

Platform 50 further includes first and second servos 70 and 60 respectively mounted to the platform. Servos 70, 60 receive control signals via lines 72 and 62 from the A direction servo/driver 41 and the B direction servo/driver 42 respectively. Shaft 71 of servo 70 is attached to fixture 213 of movable connector stage 20 and upon the reception of control signals from driver 41 moves the fixture 213 in direction a—a in respect to the fixed connector stage 10.

Shaft 61 of servo 60 is configured as a worm gear which mates with an associated threaded shaft 53 extending from platform 51. Threaded shaft 53 is mounted within a threaded bore 54 which extends though platform 51. Further, shaft 53 is rotatably affixed to a base platform 55. A plurality of guide shafts 52 also extend from the base platform 55 through respective bores on platform 51.

Upon the application of control signals to servo 60 from servo driver 42, shaft 61 rotates which drives shaft 53. As shaft 53 rotates within threaded bore 54 platform 51 rides along guides 52. Depending on the direction of the rotation of shaft 61, platform 51 is either raised or lowered with respect to base 55. This action moves the movable connector stage in direction b—b.

When the best alignment possible has been achieved the movable connector stage is tightened down and bonded for permanent use and movable platform 50 removed.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An arrangement for splicing a first fiber optic cable connected to a light source, to a second fiber optic cable, said arrangement comprising:

a fixed connector stage, comprising a generally rectangular fixture having a planar top surface, said top surface having a centrally located and longitudinally oriented channel including first connector means permanently mounted to said fixed connector stage channel, said first connector means having said first fiber optic cable mounted therein;

a movable connector stage, said movable connector stage comprising a generally rectangular fixture having a planar top surface, said top surface having a centrally located and longitudinally oriented channel including second connector means permanently mounted to said movable connector stage channel, said second connector means having said second fiber optic cable mounted therein and said movable connector stage located in close proximity to said fixed connector stage with said first fiber optic cable located along a common horizontal axis with said second fiber optic cable;

alignment means including a pair of mounting pins arranged to have said movable connector stage temporarily mounted to said pins; and control means electrically connected to said alignment means and light detector means connected to said second fiber optic cable whereby, responsive to said light detector said control means transmits control signals to said alignment means moving said second connector stage relative to said first connector stage until said light detector detects a point of low loss coupling between said first fiber optic cable and said second fiber optic cable.

2. The arrangement as claimed in claim 1, wherein: said movable connector stage further includes a pair of holes oriented parallel and in spaced relation to the other traversing through said movable connector stage perpendicular to said movable connector stage channel, said holes arranged to accept said alignment means pins substantially therein.

3. The arrangement as claimed in claim 1, wherein: said first fiber optic cable includes a prepared end having said prepared end cleaved and polished, and said first connector means comprises a first cylindrical connector body and a second cylindrical head end, said head end extending from one end of said connector body, and said connector body and said head end includes a centrally located and longitudinally oriented bore extending through said connector body and said head end is arranged to have said first fiber optic cable prepared end inserted into said connector body bore on an end opposite said head end and to extend through said connector body to said head end, terminating said prepared end in a first connection cavity.

4. The arrangement as claimed in claim 3, wherein: said second fiber optic cable includes a prepared end having said prepared end cleaved and polished, and said second connector means comprises a first cylindrical connector body and a second cylindrical head end and said head end extends from one end of said connector body, said connector body and said head end including a centrally located and longitudinally oriented bore extending through said connector body and said head end arranged to have said second fiber optic cable prepared end inserted into said connector body bore on an end opposite said head end, extending through said connector body to said head end, terminating said prepared end in a second connection cavity whereby, said first connection cavity and said second connection cavity are located along said common horizontal axis.

5. The arrangement as claimed in claim 1, wherein: said alignment means comprises a first movable platform and a second stationary platform said movable platform including said pair of mounting pins, and said movable platform further including first and second servo devices connected to said control means and said first servo device including an output shaft arranged to move said movable connector stage in a first direction responsive to control signals from said control means.

6. The arrangement as claimed in claim 5, wherein: said alignment means second servo device includes an output shaft arranged to move said alignment means movable platform vertically in respect to said second stationary platform thereby, moving said movable connector stage in a second direction responsive to said control signals from said control means.

7. The arrangement as claimed in claim 5, wherein: in said first direction said movable connector stage is moved horizontally perpendicularly to said common horizontal axis.

8. The arrangement as claimed in claim 6, wherein: in said second direction said movable connector stage is moved vertically, perpendicularly to said common horizontal axis.

9. The arrangement as claimed in claim 1, wherein: subsequent to the detection of said point of low loss coupling between said first fiber optic cable and said second fiber optic cable said alignment means is removed and said movable connector stage is fixed and retained in position relative to said fixed connector stage.

* * * * *